April 12, 1955     H. P. HUBERTZ     2,706,268
CONTROL SYSTEM FOR REVERSIBLE MOTOR
Filed April 15, 1953
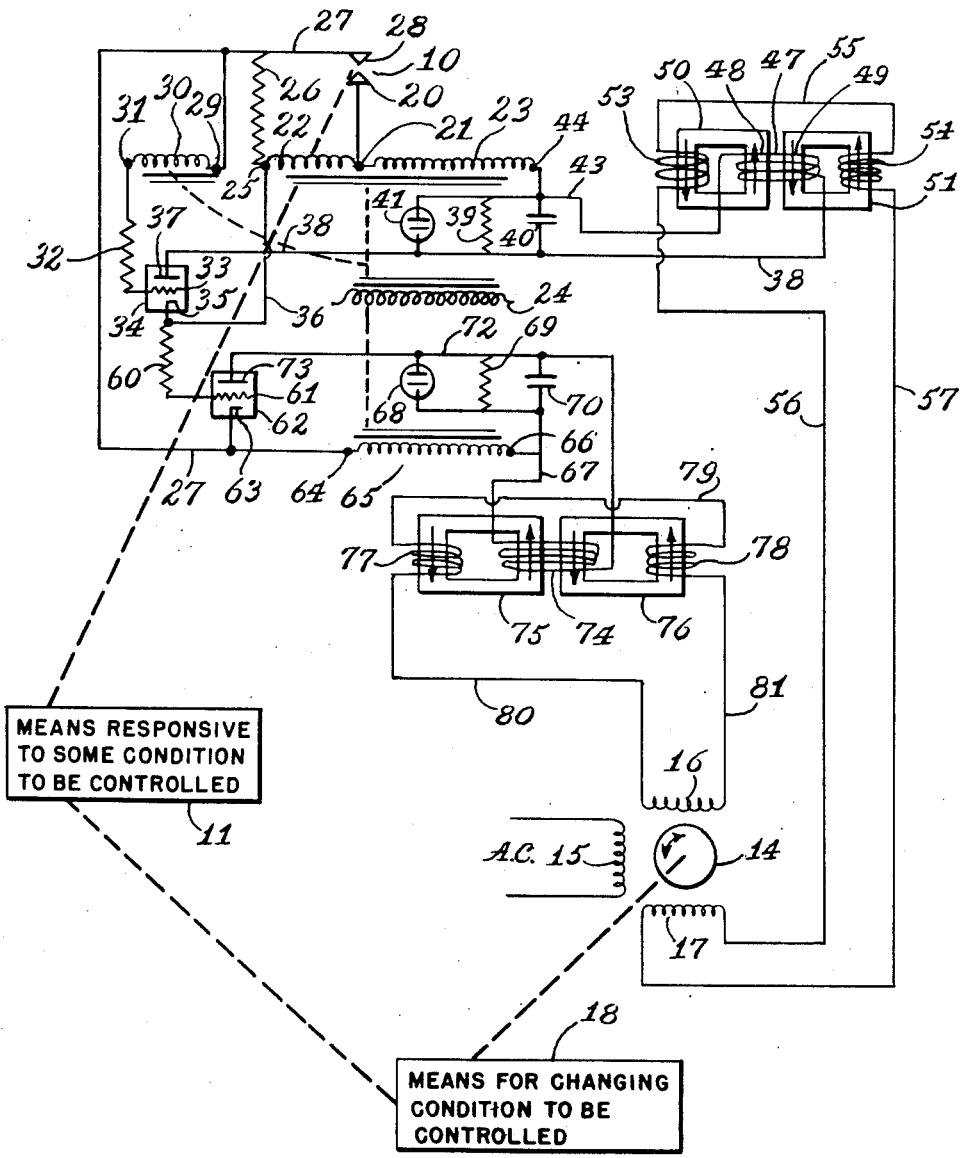
Inventor:
Halvard P. Hubertz
By Robert L. Kahn
Attorney

United States Patent Office 2,706,268
Patented Apr. 12, 1955

2,706,268
CONTROL SYSTEM FOR REVERSIBLE MOTOR

Halvard P. Hubertz, Chicago, Ill.

Application April 15, 1953, Serial No. 349,057

5 Claims. (Cl. 318—208)

This invention relates to a control ssytem and particularly to a current control system as used, for example, in a reversible motor of the induction type. While the invention may be used with any size induction motor, it is particularly adapted for use with small size motors whose power rating is below about 100 watts. Such motors are frequently used for controlling larger and more powerful devices as switches, valves or the like.

A system embodying the present invention may be used in connection with temperature control, pressure control, water level control or the control of any other physical quantity or condition which is likely to vary. In general, the control system embodying the present invention is particularly useful when a single pair of electrical contacts are opened or closed in response to the condition to be controlled. For example, in a simple thermostatic system, a simple thermostat having a fixed and movable contact which may be slowly opened or closed may be used.

A system embodying the present invention is rugged, foolproof, positive in its operation and relatively simple. Furthermore, the slowly operated contacts have no substantial potential or current to withstand, with the result that there is no danger of arcing or pitting of the contacts.

For a more thorough understanding of the invention, reference will now be made to the drawing, wherein the single figure shows in diagrammatic form an exemplary system embodying the present invention. Variations will occur to those skilled in the art and it is understood that such variations are within the scope of the invention.

Referring to the drawing, electrical contacts generally indicated by numeral 10 are mechanically or otherwise connected to any means 11 for opening or closing these contacts in response to some condition to be controlled. Thus 11 may be a strip of bimetal, a pressure gauge, a float for indicating level, or any other means which will generate a movement of at least one contact as the condition to be controlled changes. It is understood that the direction of or sense of change of condition to be controlled will control the direction of contact movement. Controlled by contacts 10 through the intermediary of the system to be described is induction motor 14 having exciting primary winding 15 and secondary shading windings 16 and 17. Windings 15 of the motor may be considered as a primary winding for connection to a source of alternating current. Windings 16 and 17 function as secondaries and when one of these windings has current flowing therein, the rotor of the motor will turn in the proper direction, depending upon which winding is excited. Inasmuch as such reversible motors are well known, no further description of the motor or its mode of operation will be given.

Motor 14 is coupled in any suitable manner to means 18 for changing the condition to be controlled. Thus, if the condition to be controlled is temperature, motor 14 may control suitable means for either generating heat or cooling, depending upon which direction the temperature is to go. If pressure is to be controlled, motor 14 may control suitable pressure or vacuum generating means. In general, it is understood that motor 14 merely affects some means for changing the condition to be controlled and does not in itself change the condition to be controlled. In other words, in the case of a furnace, motor 14 would simply control switching means for turning a motor or blower on. Motor 14 itself would ordinarily not be the means for directly changing the condition to be controlled. Between means 18 and means 11 is some suitable physical coupling or connection or interaction so that means 11 will be affected by means 18. Thus means 11 may be a thermostat responsive to temperature which may be raised or lowered by a furnace or a cooling unit embodying means 18.

In general, contacts 10 are of the type which may be opened and closed slowly, although snap action means for controlling the contacts may be provided. Referring to contacts 10, fixed contact 20 is connected to junction 21. Junction 21 connects windings 22 and 23 of a transformer whose primary is 24. Junction 21 may be a tap on a continuous winding as far as polarity is concerned. Primary 24 cooperates with a number of secondaries. Winding 22 has substantially less turns than winding 23, the ratio being apparent later. Winding 22 has terminal 25 connected by resistor 26 to wire 27 going to contact 28. It is immaterial whether contact 20 is fixed and contact 28 is movable or the reverse. Wire 27 is connected to terminal 29 of secondary winding 30. Winding 30 has substantially the same number of turns as winding 22 and is so poled that terminal 29 is positive to terminal 31 simultaneously when terminal 21 is positive to terminal 25. Winding 30 has terminal 31 connected through grid resistor 32 to control grid 33 of vacuum tube 34. Vacuum tube 34 has cathode 35 connected by wire 36 to terminal 25. Vacuum tube 34 has anode 37 connected by wire 38 to one side each of resistor 39, condenser 40 and gas discharge tube or neon light 41. The gas discharge tube, resistor and condenser are in parallel and the top terminals are connected to wire 43. Wire 43 is connected to terminal 44 of transformer secondary 23.

Wire 43 is also connecetd to winding 47 linking adjoining legs 48 and 49 of laminated reactor cores 50 and 51. These cores may be rectangular cores and laminated, the plane of the laminations being parallel to the surface of the paper. In practice, core 50 and 51 will consist of stacks of conventional laminations which are cut to permit the application of a completed winding upon the core legs. Wire 38 is connected to the other terminal of winding 47. Cores 50 and 51 have windings 53 and 54 here shown as being on the outer legs, respectively, these two windings being connected in series by wire 55 and being connected by wires 56 and 57 to the terminals of shading winding 17. Windings 53 and 54 are connected so that the magnetic flux in leg 48 goes in the opposite direction to the flux on leg 49. The two windings should be balanced as far as the magnetic fluxes in legs 48 and 49 are concerned.

Referring to vacuum tube 34, cathode 35 is connected by grid resistor 60 to control grid 61 of vacuum tube 62. Vacuum tube 62 is preferably similar in operating characteristics to vacuum tube 34 and preferably both of these tubes are operated to draw the same space current under conducting conditions. Grid resistor 60, in general, must be greater than resistor 32. Thus about a two to one ratio will operate well.

Vacuum tube 62 has cathode 63 connected to wire 27. Wire 27 is connected to terminal 64 of secondary winding 65 of the transformer. Winding 65 has terminal 66 connected to wire 67. Winding 65 is a source of potential substantially equal in value and having the same phase as the potential across terminals 25 and 44. When terminal 66 is positive, terminal 44 should also be positive. Wire 67 is connected at one end thereof to one terminal of lamp 68, resistor 69 and condenser 70. The other terminal of the lamp, resistor and condenser are connected to wire 72 which in turn is connected to anode 73 of vacuum tube 62.

Wires 67 and 72 are connected to the terminals of winding 74 linking reactor cores 75 and 76. Cores 75 and 76 are similar to cores 50 and 51. Cores 75 and 76 have windings 77 and 78. These two windings are interconnected by wire 79 and are designed to be in balanced relation as with windings 53 and 54. Windings 77 and 78 are connected by wires 80 and 81 to shading winding 16.

It is preferred to have cores 50 and 51 on the one hand and cores 75 and 76 on the other hand, as similar as possible and their corresponding windings should also be similar. It is preferred to operate the four cores at a relatively low flux density with respect to the A. C. outer windings 53, 54, 77 and 78 and at high flux density with respect to D. C. windings 47 and 74. The two tubes should also be operated so their respective space currents are generally equal for conducting conditions.

In general, the impedance offered by one pair of windings, such as 53 and 54 for example, will be higher or lower, depending upon the conditions of the system, than the impedance offered by windings 77 and 78. Thus, if motor 14 is to be turned in one direction, say the direction determined by winding 16, then the impedance of windings 77 and 78 must be low so that winding 16 may be considered as practically short circuited. As the same time, however, winding 17 must be practically open circuited and this condition will be obtained if the impedances of windings 53 and 54 are high. The reverse will be true when the direction of motor 14 is to change. For motor 14 to run at equal speeds in the two directions, the two reactance controls should be as symmetrical as possible and should be equal and opposite in their actions.

Referring to the system in detail, the operation will now be described with reference to the circuits. Assuming that contacts 10 are open, vacuum tube 34 will be cut off. In discussing whether a tube conducts or does not conduct, only those parts of the cycle will be considered when the applied potential to the anode is positive. Assuming that terminal 44 is positive, terminal 25 may be zero. With contacts 10 open, terminal 29 will also be zero. Junction 31 will be negative to terminal 29. The control grid will therefore be negative to cathode 35 and tube 34 will block. If no current flows through resistor 26 control grid 61 and cathode 62 will be at the same potential and tube 62 will conduct.

With tube 34 cut off, no space current will flow through this tube and, accordingly, there will be no current through winding 47. The inductance of cores 50 and 51 will be high and windings 53 and 54 will, therefore, have a high impedance thus practically open-circuiting winding 17 of the motor.

At the same time, tube 62 will conduct causing current to flow through winding 74. By operating cores 75 and 76 at high D. C. flux density, the effective impedance of windings 77 and 78 will be low and this will permit winding 16 to be energized. Motor 14 will therefore turn in the direction determined by winding 16.

When contacts 10 are closed, vacuum tube 34 conducts. Thus, when contacts 10 are closed, a circuit for winding 22 is completed through contacts 10 and resistor 26. Terminal 25 will be negative to wire 27. This means, therefore, that grid 61 will be negative to cathode 63 and cut tube 62 off. With contacts 10 closed, the potential of terminal 29 becomes equal to the potential of terminal 21. The potential of terminal 31 becomes equal to the potential of terminal 25. This is on the assumption that windings 22 and 30 develop substantially equal potentials and that the current drain through resistor 26 has negligible effects on the potential developed by winding 22. With this condition, the potential of cathode 35 becomes equal to the potential of grid 33 and tube 34 conducts.

Other systems requiring a current control may also use the new system. It is also possible to use resistance networks for controlling and energizing the two vacuum tubes. Thus for example, windings 22 and 23 may be replaced by resistors and an alternating or direct potential impressed across terminals 25 and 44. If direct, then terminal 44 must be positive. Winding 30 may also be replaced by a resistor and have alternating or direct current flowing through it. In general, the values of resistors for replacing these windings will be substantially lower than resistor 26. Winding 65 may similarly be replaced by a resistor having alternating or direct potential impressed across the same. In fact, conventional plate battery energizing circuits may be used, taking care, however, to provide suitable voltage dividers and observing polarity requirements.

In general, the value of resistor 26 may be high enough so that a small current can flow through it. The various potentials will be indicated by tube requirements. Thus, the potential across winding 22 will generally be low, of the order usual for cutting off a vacuum tube. The potential across winding 23 will be the usual plate potential for the vacuum tube.

It is possible to have other loads for the plate circuits of the two tubes than the reactors and instead use the current or potential drop effects.

The load reactors are shown as having two physically separate iron cores for each reactor unit. Thus cores 50 and 51 are separate but cooperate to form one reactor unit. This separation of cores is advantageous for the reason that the A. C. flux for windings 53 and 54 will pass through the respective adjoining legs 48 and 49. If cores 50 and 51 are combined into one three-legged core having a common center leg, little if any A. C. magnetic flux would pass through the common leg. The two core reactor can generally respond faster than a three-legged core to changes in current in winding 47. It is understood, however, that a three-legged core reactor may be used or that a single core having one A. C. and one D. C. winding may be used as a load.

The A. C. windings, such as 53 and 54 for example, may be disposed on inside legs 48 and 49 respectively, A. C. winding 47 being on the outside of the two windings. This arrangement provides for even quicker reactor response.

In effect, winding 23 may be considered as being one source of potential, whose terminal 44 is effectively positive. Windings 22 and 30 are second and third sources of potential whose terminals 21 and 29 are also effectively positive. The potential developed by winding 23 is greater than that developed by each of windings 22 and 30. The potentials developed by windings 22 and 30 are substantially equal. Winding 65 may be considered as a fourth source of potential whose terminal 66 is effectively positive. Where these potential sources are transformer windings, then all effective positive terminals are in phase. In other words, by the expression "effectively positive" is meant that terminals having that polarity are all positive at the same time and thus are in phase. The potential across terminals 64 and 66 should be substantially equal to the potential across 25 and 44. With regard to gas tubes 41 and 68, the potential across each will be maximum when the associated vacuum tube will be conducting. The circuits may be so designed that a gas tube glows when the associated tube is conducting. These gas tubes may be omitted if desired.

While the resistance of resistor 60 is preferably greater than that of 32, in certain instances, this relationship may be reversed. The type of tubes used, the arrangements of the various transformer windings and circuit design, in general, will have an important bearing on this relationship of resistor values.

What is claimed is:

1. A control system having only two positions, said system comprising three sources of potential each having effectively positive and negative terminals, said second and third sources developing substantially equal potentials and the first source developing a greater potential than either of the other sources, a direct metallic connection between the negative terminal of the first source and positive terminal of the second source, a resistor connected between the negative terminal of the second source and positive terminal of the third source, a pair of contacts connected between the positive terminal of said second potential source and positive terminal of said third source and adapted to be opened or closed, depending upon some physical variant to be controlled, a first grid resistor connected between the negative terminal of said third potential source and control electrode of a first vacuum tube having cathode, anode and control electrodes, a load connected between the anode and positive terminal of the first potential source, a connection between the cathode and negative terminal of the second potential source, a second grid resistor from the cathode to the control electrode of a second vacuum tube having cathode, anode and control electrodes, a direct metallic connection between the second cathode and positive terminal of the third potential source, a load and fourth potential source connected between the second cathode and second anode, said fourth potential source having substantially the same potential difference as exists across the first and second sources in series and sensing means responsive to the difference between the two load currents for control purposes.

2. A control system having only two positions, said system comprising at least one transformer having three secondary windings as three sources of potential, each winding having effectively positive and negative terminals, the second and third windings developing substantially equal potentials and the first winding developing a larger potential than the second or third windings, a direct metallic connection between the negative terminal of the first winding and positive terminal of the second winding, a resistor connected between the negative and positive terminals of the second and third windings, a pair of contacts connected to the positive terminals of said second and third windings, said contacts being adapted to be opened or closed depending upon some variant to be controlled, a first grid resistor connected between the negative terminal of the third winding and control electrode of a first vacuum tube having cathode, anode and control electrodes, a load connected between the anode and positive terminal of said first winding, a direct metallic connection between the cathode and negative terminal of the second winding, a second grid resistor having a value substantially higher than the first grid resistor, connected between the cathode of said first tube and the control electrode of a second vacuum tube having cathode, anode and control electrodes, a direct metallic connection between the second cathode and positive terminal of the third winding, a load and a transformer secondary connected between the second cathode and second anode and sensing means responsive to the difference between the two load currents for control purposes.

3. The system according to claim 2 wherein the loads in the anode circuits of said two vacuum tubes comprise iron core reactor windings, said windings forming part of reactors having alternating current windings, the load windings serving to magnetically bias the reactor cores so that the magnetic reluctance of the cores may be varied.

4. The control system of claim 2 wherein the sensing means comprises a reactor for each tube, each reactor having two physically separate ferromagnetic cores having adjoining legs, a D. C. winding for the two adjoining legs, one D. C. winding connected as one tube load and the other D. C. winding connected as the other tube load, each reactor core having an A. C. winding with the A. C. windings of a reactor connected together, and an A. C. source for the A. C. windings of each reactor, the A. C. windings for a reactor being connected so that the magnetic fluxes in the adjoining legs linked by the D. C. winding substantially balance out.

5. The system according to claim 4 wherein the last-named A. C. sources comprise shading windings of an induction motor.

References Cited in the file of this patent

UNITED STATES PATENTS

| | | |
|---|---|---|
| 2,109,776 | Johnson | Mar. 1, 1938 |
| 2,256,760 | Johnson | Sept. 23, 1941 |
| 2,519,562 | Glass et al. | Aug. 22, 1950 |
| 2,529,450 | Hornfeck | Nov. 7, 1950 |
| 2,537,027 | Burkhard, Jr. | Jan. 9, 1951 |
| 2,617,973 | Wolff, Jr. et al. | Nov. 11, 1952 |